Sept. 18, 1962     A. J. WAGNER     3,054,605

BUTT-WELD PIPE MANUFACTURE

Filed Aug. 23, 1960     2 Sheets-Sheet 1

INVENTOR.
*August J. Wagner*
BY
*Frease, Bishop, Johns & Schick*
ATTORNEYS

Sept. 18, 1962     A. J. WAGNER     3,054,605
BUTT-WELD PIPE MANUFACTURE
Filed Aug. 23, 1960     2 Sheets-Sheet 2
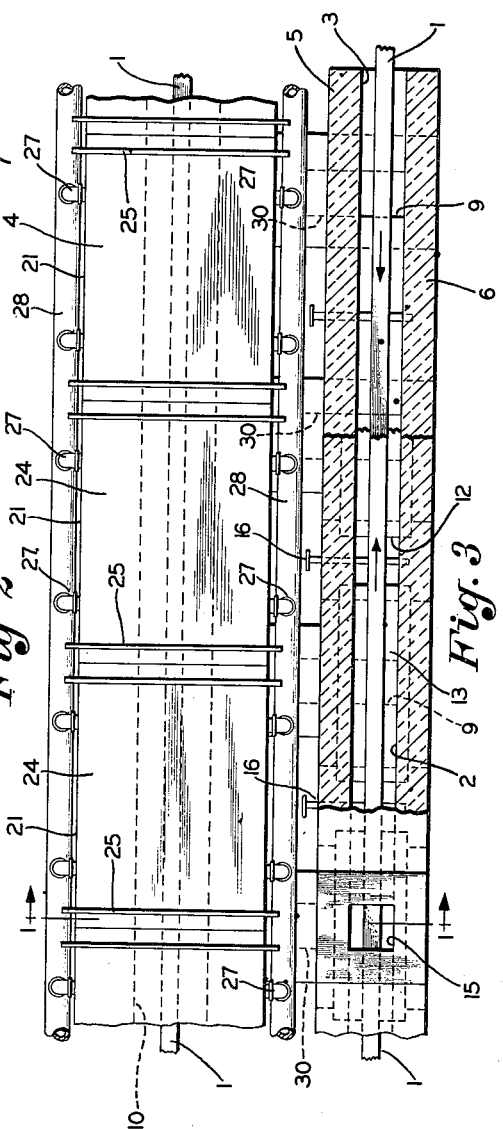
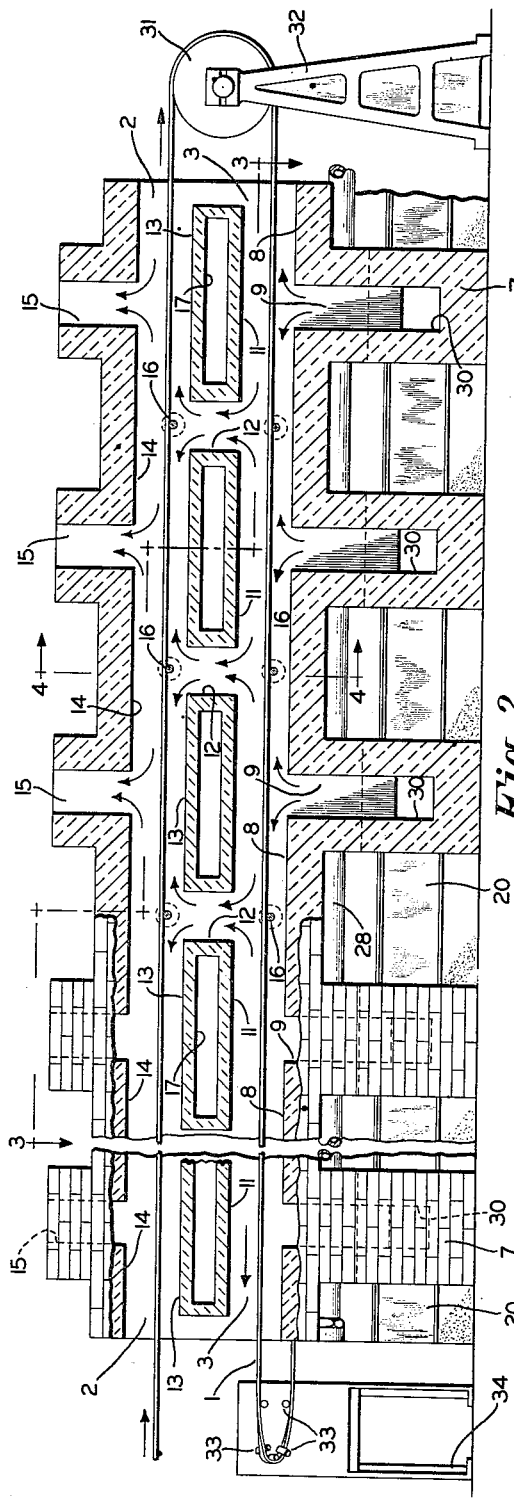
INVENTOR.
August J. Wagner
BY
Frease, Bishop, Johns & Schick
ATTORNEYS United States Patent Office 3,054,605
Patented Sept. 18, 1962

3,054,605
BUTT-WELD PIPE MANUFACTURE
August J. Wagner, Sharon, Pa., assignor to Sharon Tube Company, Sharon, Pa., a corporation of Pennsylvania
Filed Aug. 23, 1960, Ser. No. 51,446
2 Claims. (Cl. 263—3)

This invention relates to the continuous manufacture of butt-weld pipe from skelp and more particularly it pertains to the preheating of skelp before it enters the skelp heating furnace by using waste heat gases from the furnace to preheat the skelp as the skelp travels continuously from a source of supply to the furnace in the production of continuous butt-weld pipe or tubing.

The invention constitutes an improvement upon the invention of Patent No. 2,792,206 of August J. Wagner. In that patent skelp is moved continuously through a single preheat tunnel heated by furnace waste heat gases before entering the skelp heating furnace. The skelp makes a double pass first in one direction and then in the other direction through the single preheat tunnel before entering the furnace and absorbs heat from the waste heat gases to raise the skelp temperature in the preheat tunnel to an intermediate level, such as 1400° F. As a result of that procedure, many advantages were obtained which not only resulted in a more economical operation but also provided a better product.

The invention also constitutes an improvement upon the invention of August J. Wagner entitled "Butt-Weld Pipe Manufacture," Ser. No. 30,612, filed May 20, 1960, now abandoned, in which skelp is moved continuously through a pair of horizontally spaced preheat tunnels on its way to the main skelp heating furnace, and in which the skelp is preliminarily heated in the successive side-by-side tunnels by waste heat gases which move in a generally counterflow manner from the main heating furnace to the preheat tunnels.

Although these prior constructions achieve many advantages, the very nature of their particular arrangements inherently involves certain limitations in their use. In the butt-weld pipe furnace and preheat tunnel arrangement of Patent No. 2,792,206 the use of a single preheat tunnel in which the skelp made two passes greatly reduces the highest temperature to which the skelp ultimately can be heated in the tunnel before entering the main skelp heating furnace. Moreover, the greater the size of skelp used, both in gauge and width, the less efficient is the over-all pipe manufacturing operation because not only of the requirement of using more gas per ton of finished pipe product but also of the necessity of reducing the speed of heavier gauges of skelp being preheated for the manufacture of butt-weld pipe.

It has been found that unexpected and substantial increases in the efficiency of operation of a butt-weld pipe furnace can be derived where two or more preheat tunnels are used in conjunction with the main skelp heating furnace with the preheat tunnels disposed immediately one above the other; and with waste heat gas inlets for one tunnel in the bottom tunnel wall staggered longitudinally of the tunnel with respect to waste gas outlets for the one tunnel in the top tunnel wall, which in turn form the inlets in the bottom wall of a subsequent preheat tunnel. By providing a staggered and bottom-top tunnel wall arrangement of inlets and outlets for the waste heat gases traveling into and out of each particular preheat tunnel, a substantially uniform tunnel temperature is created and maintained around the skelp passing through the tunnel throughout the length of the particular tunnel; and the waste gases must travel in divided paths through zones of each tunnel in passing from the main heating furnace ultimately to the atmosphere.

It has been found that where skelp makes a single pass through a preheat tunnel, production increases 58% as compared with direct skelp heating in a furnace with no preheat tunnel. Where the skelp makes a double pass through a single preheat tunnel production increases only 18% more. However, where the skelp makes a single pass through two successive preheat tunnels, the output increases approximately 120%. In other words, by using two or more preheat tunnels through which the skelp successively makes a single pass, rather than one preheat tunnel through which the skelp makes two passes, substantially greater production output is achieved. One reason for the greater output is that the skelp is at a higher temperature, by already having been preheated somewhat, when entering the second tunnel and therefore can be heated to a higher temperature by the high temperature waste gases discharged directly from the main furnace, before the skelp enters the main heating furnace.

Where the skelp makes a double pass in a single preheat tunnel the cooling effect of the incoming pass reduces the mean tunnel gas temperature available for heating the outgoing pass, and as a result the total heat absorbed by the skelp in the preheat tunnel is less than is possible where the skelp makes a single pass through two successive preheat tunnels.

The efficiency increase in using a construction having two preheat tunnels over a construction using one tunnel with two passes is 35 to 40%. By heating the skelp in two or more successive preheat tunnels with a single pass in each, the temperature of the skelp is increased approximately 250° F. over the highest skelp temperature obtained where the skelp makes a double pass through a single preheat tunnel.

Moreover, where waste gases are taken from the bottom of the main furnace rather than from the top, the combustion gases in the furnace are more completely consumed before they enter the preheat tunnel stage. As a result of more complete combustion, the required amount of combustion gases may be reduced but the product is better because it is not exposed to incompletely consumed waste heat gases.

Although the advantages described of using single skelp passes through successive preheat tunnels are present to a large extent in using the horizontally spaced side-by-side tunnel arrangement of said application, Serial No. 30,612; the use of a plurality of vertically arranged immediately adjacent preheat tunnels instead of horizontally spaced side-by-side preheat tunnels has many additional advantages, more particularly when processing smaller or lighter gauge skelp, for instance in manufacture of up to about 2" pipe.

First of all, floor space can be conserved since the preheat tunnels are stacked one upon another. This stacked arrangement which passes through the preheat tunnels at various levels does not involve operating difficulties when processing light gauge skelp since the skelp is not heavy enough in weight to involve handling difficulties for threading the skelp through the successive preheat tunnels.

Next, the stacked tunnels when processing light gauge skelp may have a minimum vertical spacing because light gauge skelp may be turned around a small radius roll in reversing the direction of skelp travel between successive tunnels. Where heavy gauge skelp is involved, the side-by-side arrangement is required, because a large turning radius must be used whether the skelp is turned around a wheel, or is twisted on edge in making a turn between successive passes, as shown in said application, Serial No. 30,612.

The stacked arrangement of two or more preheat tunnels also provides a more compact arrangement in which the waste heat gases travel most efficiently from their source (the main heating furnace) to the atmosphere whether the path of travel of the gases ultimately includes a usual stack or not.

The waste gases taken from the bottom of the main furnace are introduced into each of the stacked preheat tunnels successively through spaced inlets in the bottom wall of each tunnel and are discharged from any tunnel through spaced outlets in the top tunnel wall of any tunnel staggered longitudinally of the tunnel with respect to the tunnel inlets.

This arrangement not only provides a uniform tunnel gas temperature throughout but requires that the waste gases pass in one direction or another in divided paths along the bottom surface of the skelp moving through the tunnel, then around the edges of the skelp, and then in one direction or another along the top surface of the moving skelp in flowing from the tunnel inlets to the tunnel outlets.

This heating gas flow pattern provides for most efficient heating since both surfaces of the skelp are subject to the transfer of heat from the flowing waste gases. Furthermore, there can be no stratification or by-passing of heating gas flow in the tunnel with respect to the moving skelp which can occur if the tunnel gas inlets and outlets are both in the top tunnel wall, or if the heating gas inlets are in one side of the tunnel and the outlets on the other side.

If waste gas inlets and outlets are both in the top wall of the tunnel as shown in said copending application, Serial No. 30,612, stratified flow of the waste heating gas may occur in the top zone of the tunnel passage above the moving skelp without any substantial flow of heating gas beneath the moving skelp. This latter condition can result in less uniform heating of the skelp in the preheat tunnel and can reduce the amount of heat absorbed by the moving skelp.

The heating gas flow pattern with the staggered preheat tunnel arrangement involves only one right angle turn for gas flow at any tunnel inlet and only one right angle turn at any tunnel outlet, as the waste gases flow from a passage connecting with a tunnel inlet and the main furnace, or to a passage connecting with a tunnel outlet and a succeeding tunnel inlet, or to a passage connecting with a tunnel outlet for the last preheat tunnel and the stack.

In comparison, where successive tunnels are located side-by-side with horizontal and downturned connecting passages between the tunnel inlets and outlets as shown in said copending application, Serial No. 30,612, the waste gases must make two right angle turns at any tunnel inlet or tunnel outlet.

Since any right angle turn in the flow of gases affects the flow velocity, the stacked arrangement by reducing from two to one the number of right angle gas flow turns involved at any tunnel inlet or outlet, provides better waste gas flow conditions, and results in more uniformly and efficiently heating the moving skelp in any preheat tunnel.

In addition, the flow pattern for the waste gases through the stacked arrangement of preheat tunnels is always progressively upward from the waste gas inlets for the first preheat tunnel to the waste gas outlets for the next preheat tunnel. This arrangement enables natural draft to be utilized to the fullest extent.

On the other hand, with the side-by-side preheat tunnel arrangement of said copending application, Serial No. 30,612, the flow pattern for the waste gases from the furnace is up, across, down, along a tunnel, up, across, down, along a next tunnel, and then to a stack. Thus some of the benefits of natural draft are lost since the up, across and then down flow pattern in effect "bucks" the natural draft that may be utilized.

From every aspect the stacked arrangement with the staggered inlets and outlets described contributes to providing most uniform and efficient heating of the skelp in the preheat tunnels.

Finally, in prior constructions where the skelp entered the furnace without being preheated, it was necessary to operate the furnace at maximum fuel capacity and at temperatures above 2800° F. to quickly raise the temperature of the skelp to the temperature necessary for butt-welding to form pipe or tubing. With one preheat tunnel in which the skelp made two passes, it was possible to operate the furnace at a slightly lower temperature range or continue operation at maximum temperature with an increase in the speed of the skelp moving through the furnace.

However, in accordance with the present invention using two vertically stacked preheat tunnels with the skelp making a single pass through each tunnel, the furnace can be operated in a temperature range of 2500–2700° F. Furthermore, where two preheat tunnels are vertically arranged and up to 2″ pipe is being made, the fuel gas consumption per ton of pipe produced is reduced substantially, and the skelp speed may be increased from 850 f.p.m. to at least 1200 f.p.m.

Accordingly, it is a general object of this invention to provide a new skelp heating furnace construction and operation which overcomes prior difficulties and greatly reduces the cost of manufacture of butt-weld pipe, particularly in pipe sizes of up to 2″ pipe.

It is another object of this invention to provide a skelp heating furnace construction including two or more preheat tunnels for continuous skelp through which waste heat gases flow from the main furnace to heat the skelp as the skelp moves through the tunnels successively to the main furnace, and generally with counterflow movement of the gases with respect to skelp movement.

It is another object of this invention to provide a skelp heating furnace construction including two or more preheat tunnels for continuous skelp in which the tunnels are vertically disposed or stacked with respect to each other to facilitate the manufacture of up to 2″ butt-weld pipe from smaller gauges of skelp.

Also, it is an object of the invention to provide a skelp heating furnace construction with a preheat tunnel system through which skelp is passed continuously prior to entering the main heating furnace, in which the tunnel system includes two or more successive preheat tunnels horizontally disposed and located immediately above one another, in which waste gas inlets are provided in the bottom tunnel wall of each tunnel, in which waste gas outlets are provided in the top tunnel wall of each tunnel staggered longitudinally of the tunnel with respect to the inlets, and in which the outlets for one tunnel communicate with the inlets for the next successive tunnel, so that waste heat gases flow in divided paths through each tunnel from inlets to outlets.

Likewise, it is an object of the invention to provide a skelp heating furnace construction, including a plurality of horizontally extending preheat tunnels disposed in stacked relation immediately above one another and provided with a plurality of spaced staggered waste heat gas inlet and outlet openings for each tunnel, in which the gas outlets of one tunnel are connected with the gas inlets of the next successive tunnel immediately above such one tunnel, so that waste heat furnace gases which provide the heating medium in the tunnels flow progressively upward through the stack tunnels generally in counterflow relation with respect to the movement of skelp through the tunnels.

Finally, it is an object of this invention to provide an improved skelp heating furnace construction which can be installed at a minimum cost in existing pipe mills for the purpose of generally improving butt-weld pipe products and manufacturing operations, for eliminating difficulties heretofore existing in the art, and to obtain the foregoing advantages and desiderata in a simple and effective manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicant has contemplated applying the principles—is set forth in the following description and shown in the drawings, and which is particularly and distinctly pointed out and set forth in the appended claims forming part hereof.

Generally, the nature of the improvements in the skelp heating furnace construction of the present invention may be stated as including a main skelp heating furnace chamber through which skelp is passed continuously, burners along the side walls of the chamber directed to impinge heating flames against the edges of the skelp being passed through the furnace, and waste heat gas exit passages extending from the bottom of the furnace chamber; a first preheating tunnel extending longitudinally of and spaced from the furnace and having waste gas inlet passages communicating with said furnace chamber waste heat gas exit passages and through which waste heat gases from the furnace enter said first tunnel, the first preheat tunnel also having waste gas outlet passages extending therefrom at locations staggered with respect to the first tunnel gas inlet passages; at least a second preheat tunnel extending longitudinally of and located immediately above the first preheat tunnel, the second tunnel having inlet passages communicating with the waste heat gas outlet passages from the first preheat tunnel, and the second tunnel having waste heat gas outlet passages disposed at spaced intervals between the waste heat gas inlet passages for the second tunnel; the preheat tunnels and the furnace preferably having a plurality of skelp supporting skids located at spaced intervals along their lengths for supporting the skelp as it moves through the preheat tunnels and furnace, skelp guide means for directing continuously moving skelp from the exit end of the second tunnel into the entry end of the first tunnel, and second skelp guide means for directing and continuously feeding moving skelp emerging from the first preheat tunnel into the entry end of the main heating furnace.

The improved butt-weld furnace construction is shown by way of example somewhat diagrammatically in the accompanying drawings forming part hereof, wherein:

FIG. 2 is a vertical sectional view, partly in elevation, showing somewhat diagrammatically the manner in which skelp passes in sequence through the preheat tunnels and the location of the waste heat gas inlets and outlets for the several preheat tunnels;

FIG. 3 is a horizontal sectional view, partly in plan, taken on the line 3—3 of FIG. 2.

Similar numerals refer to similar parts throughout the several figures of the drawings.

Figures 1, 4:
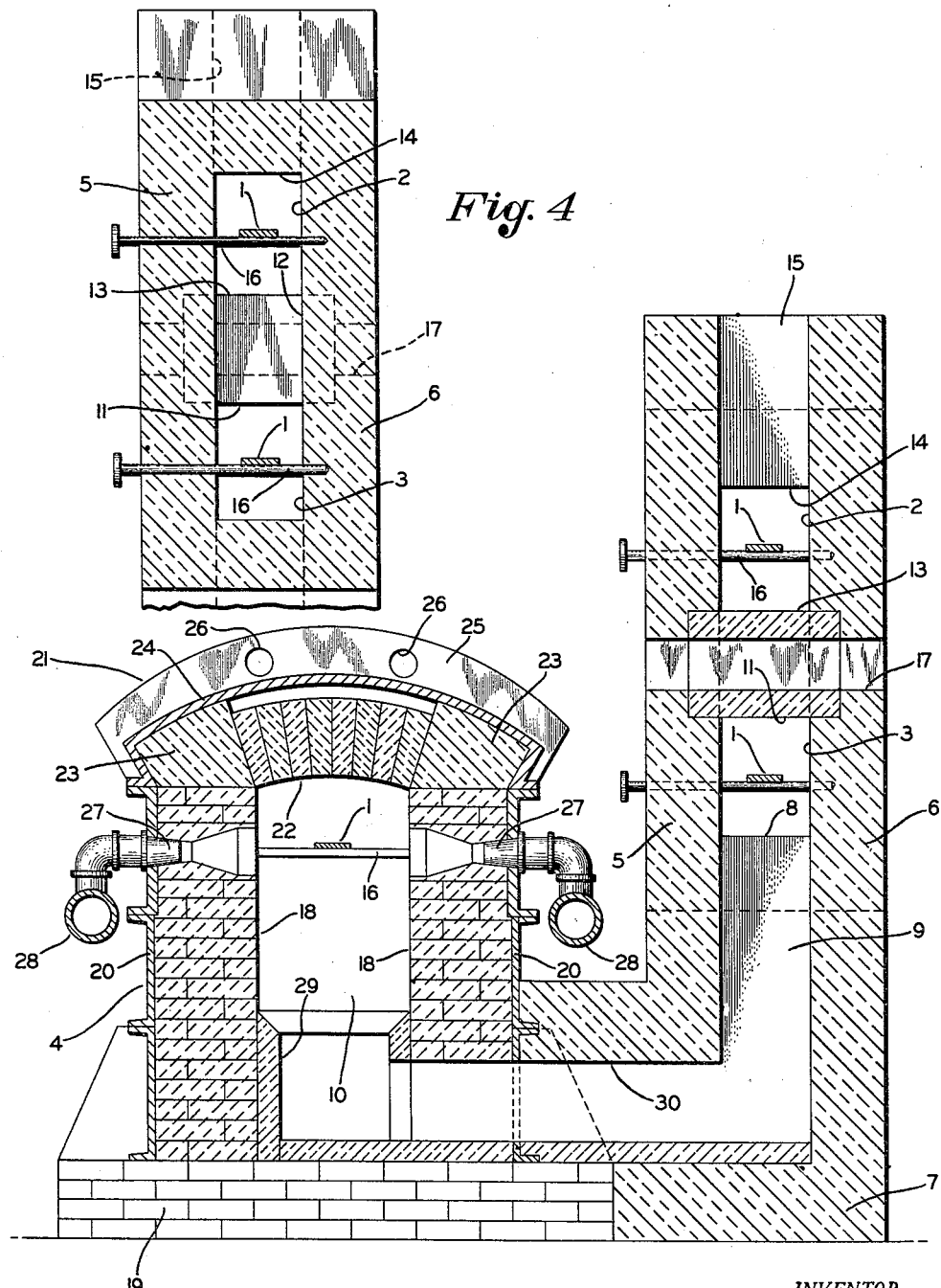
FIGURE 1 is a vertical sectional view looking in the direction of arrows 1—1, FIG. 3, showing the position of two stacked preheat tunnels with respect to a main heating furnace and the manner in which waste heat gas passages are disposed between the furnace and preheat tunnels.
FIG. 4 is a vertical sectional view taken on the line 4—4 of FIG. 2.

The preheat tunnel arrangement, as shown, includes a first preheat tunnel 3 and a second preheat tunnel 2. Continuous skelp 1 enters the second preheat tunnel 2 from which it passes to the first preheat tunnel 3 and then passes through a main heating furnace 4. The tunnels 2 and 3 are interconnected with the main heating furnace 4 by waste heat gas passages so that the waste heat gases from the main heating furnace 4 flow through the passages first to the preheat tunnel 3 and then to the preheat tunnel 2. It is understood for the purpose of this invention that two or more preheat tunnels may be used to elevate the temperature of skelp 1 from room temperature to a temperature of 2500–2650° F. in the main heating furnace 4.

The preheat tunnels 2 and 3 are elongated chambers preferably coextensive and parallel with the main heating furnace 4. The tunnels 2 and 3 are disposed vertically one above the other in stacked relation, having preferably common opposite side walls 5 and 6 composed of heat insulating material such as fire brick extending upwards from a footer 7 as shown in FIG. 1. The bottom wall 8 of the tunnel 3 is provided with a plurality of spaced waste heat gas inlet passages 9 (FIG. 2) and the top wall 11 of the tunnel 3 is provided with a plurality of waste heat gas outlet passages 12 which are staggered longitudinally of the tunnel with respect to the passages 9.

Similarly, the preheat tunnel 2 has a bottom wall 13 provided with inlets formed by the upper ends of passages 12 which provide communication between the tunnels 2 and 3. In addition, the tunnel 2 has a top wall 14 provided with a plurality of spaced waste gas outlets 15, and the outlets 15 are staggered with respect to the passages 12. Moreover, corresponding pairs of inlets 9 and outlets 15 are preferably aligned with each other as shown in FIG. 2. All of the side walls 5 and 6 and tunnel bottom and top walls 8, 11, 13, and 14 are composed of heat insulating material such as fire brick.

The moving skelp 1 is supported in each tunnel by spaced skid bars 16 which extend across and through each tunnel 2 and 3 between the side walls 5 and 6 (FIG. 1). The top wall 11 of the tunnel 3 and the bottom wall 13 of the tunnel 2 may be spaced by openings 17 at spaced intervals throughout the length of the structure. However, such openings 17 are not necessary to the operation of the preheaters and may be filled wtih fire brick or insulating material.

As shown in FIG. 1, the furnace 4 has an elongated chamber 10 formed by similar opposite side walls 18 composed of refractory material supported on a base 19. The exterior of the side walls 18 may be reinforced by structural members 20. The furnace heating chamber 10 is also closed at the top by removable cover members 21 (FIG. 3) which include a refractory arch wall 22, similar side portions 23 as well as arcuate plates 24 having spaced upright flanges 25 with crane hook engaging openings 26.

The main heating furnace 4 is provided with a plurality of spaced gas burners 27 on opposite sides of the chamber 10, which preferably are aligned with the skelp 1 so that gas flames are directed to impinge upon the opposite edges of the skelp. Each burner 27 is connected to a manifold pipe 28.

At spaced intervals along the bottom wall of the heating furnace chamber 10, a plurality of waste heat exhaust gas openings 29 are provided which communicate with horizontally extending passages 30 which in turn communicate with the lower ends of the waste heat gas inlet passages 9 for the tunnel 3. Accordingly, the waste heat gases discharged from the chamber 10 pass out of the chamber through the openings 29, and flow through the passages 30 and 9 into the preheat tunnel 3 where a portion of the heat of the gases is transferred to the skelp 1 passing therethrough.

As the waste heat gases enter the tunnel 3 through inlets 9 the flow is divided as shown by the arrows in FIG. 2. The waste gases thus pass or flow in one direction or another in divided paths along and beneath the bottom surface of the skelp 1 moving through tunnel 3, then around the edges of the skelp and then in one direction or another along the top surface of the moving skelp longitudinally of the tunnel to the passages 12 which form outlets for the tunnel 3.

This divided-path, one-direction-or-another flow pattern for the gases not only provides a substantially uniform mean tunnel temperature throughout the length of the tunnel 3, but also provides most efficient skelp heating since both surfaces of the skelp are subjected to the transfer of heat from the waste heat gas flow longitudinally in the tunnel along both bottom and top surfaces of the skelp.

The waste heat gases leave the tunnel 3 through passages 12 and then flow through the passages 12 into the tunnel 2, the passages 12 forming inlet openings for the tunnel 2. The divided waste heat gas flow pattern in the tunnel 2 is the same as described above with reference to the tunnel 3 and is indicated by the arrows in FIG. 2.

Where more than two preheat tunnels are used the waste heat gas flow follows the same pattern described for the tunnels 2 and 3, as shown by the arrows in FIG. 2, until as much of the heat is transferred from the gases to the skelp as is practical. Ultimately the gases are discharged through the outlet passages 15 either to the atmosphere, or by connecting conduits (not shown) to a stack of conventional construction.

As the moving skelp 1 leaves the tunnel 2 it must be turned to enter the tunnel 3 in the reverse direction. This is accomplished by passing the skelp over return roll means including a roll 31 which is rotatably mounted on a stand 32. Likewise, as the skelp leaves the preheat tunnel 3, it passes over guide means including a plurality of spaced guide rolls 33 which are mounted on a stand 34 and which direct the skelp 1 into the chamber of the main heating furnace 4 at a location which is horizontally and vertically spaced from that of the moving skelp in tunnel 3.

In operation, the improved skelp heating furnace construction described including the vertically spaced or stacked arrangement of horizontal preheat tunnels 2 and 3 directly benefits not only the butt-weld pipe product produced from the skelp 1, but also benefits the entire furnace structure. As shown in FIG. 2, the skelp 1 enters the preheat tunnel 2 at room temperature and is heated to a skelp temperature of approximately 700–900° F. in the tunnel 2, entering the tunnel 3 at that temperature, where it is additionally heated to a skelp temperature of about 1400–1600° F. Thereafter the skelp 1 enters the main heating furnace 4 which is maintained at a furnace temperature of preferably 2500° F. at the entry end and at 2650° F. at the exit end so that the skelp is heated in furnace 4 preferably to a uniform skelp edge temperature of 2600° F. for butt-welding. The skelp then passes from the furnace exit end to pipe forming and butt-welding rolls.

It is understood, however, that the temperature of the skelp 1 may vary as a function of its width and gauge. For example, in the manufacture of small-sized butt-weld pipe, such as 1/8", 1/4", and 3/8", the furnace can be operated at lower temperatures to attain the same skelp edge temperature than is possible with larger sized pipe, such as 1/2", 3/4", and up to 2" pipe. On the other hand, where the smaller sized pipe is manufactured the furnace when desired can be operated at higher rates of production without reducing the operating temperature than is possible with the larger size pipe. This may be accomplished because smaller size skelp requires less time for preheating and main furnace heating to attain the skelp edge temperature necessary for butt-welding the skelp edges to form butt-weld pipe.

The improved construction in which the preheat tunnels 2 and 3 are located one above the other provides a maximum waste heat gas flow in contact with the moving skelp.

With two or more preheat tunnels the improved constuction can be used to produce at a greater production rate with lower gas consumption per ton of pipe produced or at even higher production rates for the same gas consumption. Associated with the foregoing, however, is the simplicity of handling smaller size skelp for 1/8", 1/4", and 3/8", and up to 2" butt-weld pipe. A plurality of vertically spaced or stacked, horizontally disposed, preheat tunnels may be located relatively close together, because skelp for the smaller sized butt-weld pipe indicated can be turned around a relatively small (36 to 48 inch) turning wheel or roll such as the roll 31. On th other hand, the skelp for larger sized butt-weld pipe (above 2") requires a much greater turning radius to move from one preheat tunnel to another. Another advantage of locating the preheat tunnels closely together in stacked relation is the conservation of heat in the waste heat gases as the gases move from one tunnel to another.

However, in accordance with the invention it is necessary to provide a plurality of separate preheat tunnels in each of which the skelp makes a single pass rather than one large tunnel in which the skelp makes two passes in order to more efficiently heat the skelp with higher tunnel temperatures in successive tunnels as the strip moves to the main heating chamber. Without separate preheat tunnels, it is impossible to maintain different mean tunnel temperatures as the skelp temperature is raised. With separate preheat tunnels, cooler gases can flow through the first stage preheat tunnel and heat room temperature skelp somewhat after the gases have passed through an intermediate stage tunnel nearer the source of heat, namely the main heating chamber. By providing two or more preheat tunnels, having successively higher mean tunnel temperatures, as the skelp approaches the main heating furnace, it has a higher preheated temperature and may be heated more gradually in the main furnace, which results in a pipe product of higher quality.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific apparatus shown.

Having now described the features, discoveries and principles of the invention, the construction, operation and use of the improved apparatus and the advantageous, new and useful results obtained thereby; the new and useful parts, elements, constructions, apparatus, combinations, subcombinations, and arrangements, and mechanical equivalents obvious to those skilled in the art, are set forth in the appended claims.

What is claimed is:

1. In a skelp heating furnace construction for the manufacture of butt-weld pipe in which skelp is heated by combustion gases in a longitudinally extending main skelp heating chamber through which the skelp is passed continuously in one direction from entry end to pipe forming and butt-welding rolls, and in which the waste heat gases of combustion flow from the chamber through a series of outlets formed in the chamber bottom wall; the combination of bottom, top, and side walls forming two preheat tunnels extending parallel to and alongside of the main heating chamber, the preheat tunnels being disposed in stacked relation with a second tunnel above a first, there being a series of spaced waste heat gas inlets formed in the bottom wall of each tunnel, there being a series of spaced waste heat gas outlets formed in the top wall of each tunnel, the outlets for each tunnel being staggered with respect to the inlets for such tunnel, spaced passage means communicating between the chamber outlets and the inlets for the first tunnel, spaced passage means communicating between the outlets of the first tunnel and the inlets of the second tunnel, the staggered arrangement of inlets and outlets for each tunnel directing the flow of gases through the tunnels in divided paths and in opposite directions along each tunnel from each inlet to the next two adjacent outlets; and means for continuously passing skelp into and through the second tunnel, then through the first tunnel, and then into the main heating chamber; whereby the flow of waste heat gases from the furnace chamber is progressively upward from the waste gas inlets for the first preheat tunnel to the waste gas outlets of the second preheat tunnel; whereby the waste heat gases in flowing in divided paths from inlets to outlets in each tunnel pass in one direction or another along the bottom surface of the skelp moving through the tunnel, then around the edges of the skelp and then in one direction or another along the top surface of the moving skelp to permit transfer of heat from the flowing gases to both surfaces of the skelp; and whereby uniform and efficient heating of the skelp in the tunnels is obtained.

2. The method of preheating continuously moving skelp for a butt-weld pipe mill in a plurality of successive preheat tunnels prior to finally heating the skelp in the pipe mill main heating furnace which includes the steps of entering heating gases upwardly into a first tunnel at spaced zones at the bottom of the first tunnel, discharging the heating gases upwardly from the top of the first tunnel at spaced zones staggered with respect to the first tunnel entry zones, entering the heating gases discharged from the first tunnel upwardly into a second tunnel at spaced zones at the bottom of the second tunnel, discharging the heating gases from the second tunnel upwardly from the top of the second tunnel at spaced zones staggered with respect to the second tunnel entry zones, passing continuously moving skelp successively through the second tunnel and then the first tunnel, reversing the direction of skelp movement between said second and first tunnels, flowing the heating gases in divided paths and in opposite directions along each tunnel from each entry zone to the two next adjacent discharge zones; and in teach tunnel moving the heating gases flowing in one direction or another in the divided paths first beneath and along the bottom surface of the moving skelp, then around the edges of the skelp, and then above and along the top surface of the skelp, to provide heat transfer from the flowing gases to both surfaces of the moving skelp.

References Cited in the file of this patent

UNITED STATES PATENTS

| | | |
|---|---|---|
| 941,858 | Daniels | Nov. 30, 1909 |
| 2,214,157 | Bannister | Sept. 10, 1940 |
| 2,792,206 | Wagner | May 14, 1957 |